United States Patent
Zeitlin et al.

(10) Patent No.: US 9,667,637 B2
(45) Date of Patent: May 30, 2017

(54) NETWORK-BASED DETECTION OF AUTHENTICATION FAILURES

(71) Applicant: Guardicore Ltd., Tel Aviv (IL)

(72) Inventors: Ariel Zeitlin, Kfar Saba (IL); Pavel Gurvich, Tel Aviv (IL); Ofri Ziv, Tel Aviv (IL); Itamar Tal, Givatayim (IL)

(73) Assignee: GUARDICORE LTD., Tel Aviv (IL)

( * ) Notice: Subject to any disclaimer, the term of this patent is extended or adjusted under 35 U.S.C. 154(b) by 3 days.

(21) Appl. No.: 14/726,544

(22) Filed: May 31, 2015

(65) Prior Publication Data
US 2015/0358338 A1  Dec. 10, 2015

Related U.S. Application Data

(60) Provisional application No. 62/009,434, filed on Jun. 9, 2014.

(51) Int. Cl.
*H04L 29/06* (2006.01)
*G06F 9/455* (2006.01)

(52) U.S. Cl.
CPC ...... *H04L 63/1416* (2013.01); *G06F 9/45558* (2013.01); *G06F 2009/45587* (2013.01); *G06F 2009/45595* (2013.01)

(58) Field of Classification Search
CPC .................................................. H04L 63/1416
See application file for complete search history.

(56) References Cited

U.S. PATENT DOCUMENTS

| | | | |
|---|---|---|---|
| 6,654,882 B1 | 11/2003 | Froutan et al. | |
| 7,107,347 B1 | 9/2006 | Cohen | |
| 7,159,149 B2 | 1/2007 | Spiegel et al. | |
| 7,251,215 B1 | 7/2007 | Turner et al. | |
| 7,363,656 B2 | 4/2008 | Weber et al. | |
| 7,383,578 B2 | 6/2008 | Blake et al. | |
| 7,516,227 B2 | 4/2009 | Cohen | |
| 7,610,375 B2 | 10/2009 | Portolani et al. | |
| 7,712,143 B2 | 5/2010 | Comlekoglu | |
| 7,725,938 B2 | 5/2010 | Cothrell et al. | |
| 7,937,761 B1 | 5/2011 | Bennett | |
| 8,045,457 B1 | 10/2011 | Satish et al. | |
| 8,112,801 B2 | 2/2012 | Abdel-Aziz et al. | |
| 8,140,694 B2 | 3/2012 | Johnson | |
| 8,181,250 B2 | 5/2012 | Rafalovich et al. | |
| 8,250,632 B1 * | 8/2012 | Staddon | G06F 17/30867 705/319 |
| 8,413,216 B2 | 4/2013 | Hughes et al. | |
| 8,479,010 B2 * | 7/2013 | Cooley | G06F 21/31 713/183 |
| 8,526,433 B2 | 9/2013 | Kini et al. | |
| 8,683,584 B1 | 3/2014 | Daswani et al. | |

(Continued)

OTHER PUBLICATIONS

U.S. Appl. No. 14/262,750 Office Action dated Dec. 15, 2015.

(Continued)

*Primary Examiner* — Shawnchoy Rahman
(74) *Attorney, Agent, or Firm* — D. Kligler IP Services Ltd.

(57) ABSTRACT

A method includes monitoring communication traffic that is exchanged over a computer network. One or more authentication attempts that have failed are identified in at least part of the monitored communication traffic. Hostile activity is detected in the computer network by analyzing the failed authentication attempts.

23 Claims, 2 Drawing Sheets

(56) References Cited

U.S. PATENT DOCUMENTS

| | | | |
|---|---|---|---|
| 8,713,668 B2 | 4/2014 | Cooper et al. | |
| 8,892,766 B1 | 11/2014 | Wei et al. | |
| 8,955,122 B2 | 2/2015 | Gu et al. | |
| 8,990,938 B2 | 3/2015 | Huston et al. | |
| 9,038,151 B1 | 5/2015 | Chua et al. | |
| 2003/0137930 A1 | 7/2003 | Futernik | |
| 2003/0236995 A1* | 12/2003 | Fretwell, Jr. | H04L 63/1416 726/25 |
| 2008/0046989 A1 | 2/2008 | Wahl | |
| 2008/0289028 A1 | 11/2008 | Jansen et al. | |
| 2009/0044270 A1 | 2/2009 | Shelly et al. | |
| 2009/0073895 A1 | 3/2009 | Morgan et al. | |
| 2009/0172788 A1* | 7/2009 | Vedula | H04L 63/08 726/5 |
| 2009/0328192 A1 | 12/2009 | Yang et al. | |
| 2011/0067107 A1 | 3/2011 | Weeks et al. | |
| 2011/0191847 A1 | 8/2011 | Davis et al. | |
| 2012/0254951 A1 | 10/2012 | Munetoh et al. | |
| 2013/0179879 A1* | 7/2013 | Zhang | G06F 9/45533 718/1 |
| 2013/0269033 A1 | 10/2013 | Amaya Calvo et al. | |
| 2013/0276091 A1 | 10/2013 | Saxena et al. | |
| 2014/0115706 A1 | 4/2014 | Silva et al. | |
| 2014/0181968 A1* | 6/2014 | Ge | H04L 63/1425 726/23 |
| 2014/0181972 A1 | 6/2014 | Karta et al. | |
| 2015/0058983 A1 | 2/2015 | Zeitlin et al. | |
| 2015/0156086 A1* | 6/2015 | Chesla | H04L 43/04 709/224 |
| 2015/0188933 A1 | 7/2015 | Zeitlin et al. | |
| 2015/0229659 A1 | 8/2015 | Tal et al. | |
| 2016/0019388 A1* | 1/2016 | Singla | G06F 21/552 726/23 |

OTHER PUBLICATIONS

Prevelakis et al., "Sandboxing Applications", Proceedings of the FREENIX Track, USENIX Annual Technical Conference, 8 pages, year 2001.

Goldberg et al., "A Secure Environment for Untrusted Helper Applications: Confining the Wily Hacker", Proceedings of the Sixth USENIX UNIX Security Symposium, 14 pages, Jul. 1996.

Polychronakis et al., "Comprehensive Shellcode Detection using Runtime Heuristics", Proceedings of the 26th Annual Computer Security Applications Conference, 10 pages, Dec. 2010.

Wicherski et al., "Efficient Bytecode Analysis: Linespeed Shellcode Detection" , 11 pages, Mar. 2011.

OpenFlow Switch Specification, Version 1.1.0 Implemented (Wire Protocol 0x02), 56 pages, Feb. 28, 2011.

Cisco, "One Platform Kit (onePK) for Developers", Data sheet, 1 page, Mar. 2014.

InfiniBand Architecture Specification, vol. 1, Release 1.2.1, 1727 pages, Nov. 2007.

U.S. Appl. No. 14/262,750 Office Action dated Jul. 9, 2015.

* cited by examiner

NETWORK-BASED DETECTION OF AUTHENTICATION FAILURES

CROSS-REFERENCE TO RELATED APPLICATIONS

This application claims the benefit of U.S. Provisional Patent Application 62/009,434, filed Jun. 9, 2014, whose disclosure is incorporated herein by reference.

FIELD OF THE INVENTION

The present invention relates generally to network security, and particularly to methods and systems for security based on detecting authentication failures.

BACKGROUND OF THE INVENTION

Secure network communication often involves an authentication process, in which a communicating party proves its identity. Various authentication protocols are known in the art. Some examples include NT LAN Manager (NTLM), Remote Authentication Dial-In User Service (RADIUS) and Kerberos.

SUMMARY OF THE INVENTION

An embodiment of the present invention that is described herein provides a method including monitoring communication traffic that is exchanged over a computer network. One or more authentication attempts that have failed are identified in at least part of the monitored communication traffic. Hostile activity is detected in the computer network by analyzing the failed authentication attempts.

In some embodiments, at least part of the communication traffic traverses a virtual switching fabric in a hypervisor of a node of the computer network, and monitoring the communication traffic includes running in the hypervisor a software agent that monitors the at least part of the communication traffic. In other embodiments, monitoring the communication traffic includes passing at least part of the communication traffic in-line through an analysis unit.

In yet other embodiments, monitoring the communication traffic includes instructing a virtual or physical network element in the computer network to mirror at least part of the communication traffic for monitoring. In an example embodiment, the computer network includes a Software-Defined Network (SDN), and instructing the virtual or physical network element is performed using an SDN protocol.

In still other embodiments, monitoring the communication traffic includes running in an endpoint participating in authentication sessions a software agent that monitors the at least part of the communication traffic. The endpoint may include a client computer requesting authentication, or a server that is required to authenticate the client computer.

In some embodiments, identifying the authentication attempts that have failed includes identifying in the communication traffic an authentication response message, extracting a field value from the authentication response message, and detecting a failed authentication attempt based on the extracted field value. In an example embodiment, extracting the field value includes extracting an authentication result reported in the authentication response message. In another embodiment, identifying the authentication attempts that have failed includes deducing a failure of an authentication attempt from a count of packets exchanged during the authentication attempt.

In yet another embodiment, detecting the hostile activity includes accumulating multiple failed authentication attempts, and evaluating a detection criterion over the multiple failed authentication attempts. In still another embodiment, detecting the hostile activity includes evaluating a detection criterion that is defined to distinguish between hostile and innocent authentication failure. In an embodiment, detecting the hostile activity includes assessing whether a failed authentication attempt is hostile or innocent, by accessing software that runs in a client computer that initiated the failed authentication attempt.

In an embodiment, the method includes obtaining additional information relating to failed authentication attempts from an authentication server, and detecting the hostile activity includes identifying the hostile activity based on both the failed authentication attempts identified in the communication traffic, and the additional information.

There is additionally provided, in accordance with an embodiment of the present invention, a system including at least one interface for connecting to a computer network, and one or more processors. The processors are configured to monitor communication traffic that is exchanged over the computer network, to identify in at least part of the monitored communication traffic one or more authentication attempts that have failed, and to detect a hostile activity in the computer network by analyzing the failed authentication attempts.

There is also provided, in accordance with an embodiment of the present invention, a computer software product, the product including a tangible non-transitory computer-readable medium in which program instructions are stored. The instructions, when read by one or more processors, cause the processors to monitor communication traffic that is exchanged over a computer network, to identify in at least part of the monitored communication traffic one or more authentication attempts that have failed, and to detect a hostile activity in the computer network by analyzing the failed authentication attempts.

The present invention will be more fully understood from the following detailed description of the embodiments thereof, taken together with the drawings in which:

DETAILED DESCRIPTION OF EMBODIMENTS

Overview

Figure 1:
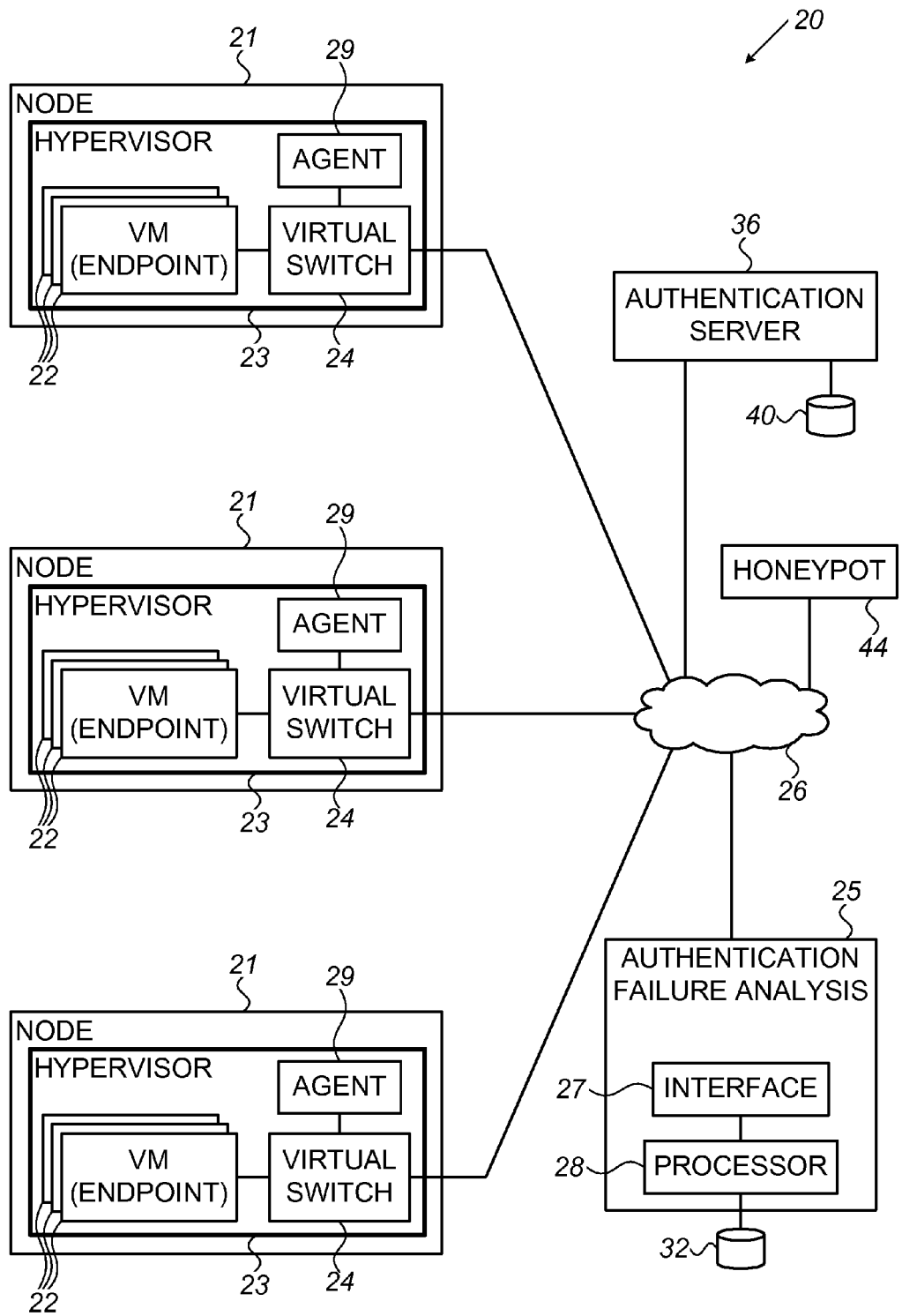
FIG. 1 is a block diagram that schematically illustrates a secure computer network, in accordance with an embodiment of the present invention.

In many computing and communication applications, a party is required to authenticate its identity before being allowed to proceed, e.g., to communicate or gain access to requested data or other resources. Authentication failure is often indicative of hostile activity, e.g., an attempt by an unauthorized user or software to gain access to some computer, software or data. Embodiments of the present invention that are described herein provide improved methods and systems for detecting hostile activity in a computer network, by identifying and analyzing failed authentication attempts.

In the context of the present patent application and in the claims, the term "authentication" refers to a process in which one party (e.g., client, user or application) attempts to prove its identity to another party (e.g., server, machine, application or operating system) by providing some verifiable credentials. Credentials may comprise, for example, a username/password pair, a security token or some biometric signature, to name just a few examples. If the credentials prove genuine, the authentication is regarded successful. Otherwise, the authentication is regarded as failed.

In some embodiments, a security system monitors communication traffic that is exchanged over the network, and identifies traffic indicative of failed authentication attempts. In an example embodiment, the system identifies in the monitored traffic communication transactions that use known authentication protocols. The system then analyzes the transactions to determine whether the underlying authentication attempts have succeeded or failed, and if failed, whether the failure is innocent or hostile.

Various implementations and system configurations can be used for accessing the network traffic, for detecting failed authentication attempts in the traffic, and for distinguishing between hostile and innocent authentication failures. For example, in some embodiments the network traffic passes in-line through the security system. In other embodiments, the system comprises software agents that are installed in the network switches (physical or virtual) and/or endpoints (physical or virtual). The agents identify authentication-related traffic, and forward such traffic to a centralized server for analysis.

An alternative solution could be to obtain information regarding failed authentication attempts from records kept by existing authentication servers in the network. Such a solution, however, inevitably relies on certain assumptions regarding the authentication servers, e.g., on their support of local or remote logging. The disclosed techniques, on the other hand, are highly robust and do not rely on any such assumptions, since they identify failed authentication attempts directly in the network traffic. Moreover, the disclosed techniques are able to enforce common criteria for detecting hostile activity, over multiple types of clients and servers and over multiple authentication protocols that may be used in the network.

System Description

FIG. 1 is a block diagram that schematically illustrates a secure computer network 20, in accordance with an embodiment of the present invention. Network 20 may implement, for example, a virtualized data center, a High-Performance Computing (HPC) network, or any other suitable application. It should be noted that the network configuration shown in FIG. 1 is depicted purely by way of example. Several alternative configurations are addressed below.

In the present example, network 20 comprises multiple compute nodes 21, such as servers, interconnected by a communication network 26. The figure shows three nodes for simplicity, but real-life networks typically comprise a large number of nodes.

Each node 21 comprises a hypervisor 23 that hosts one or more Virtual Machines (VMs) 22. The VMs are also referred to herein as endpoints. Each hypervisor further runs a virtual switching fabric that comprises one or more interconnected virtual network switches 24 and/or virtual bridges, via which the VMs of the node communicate with one another and with VMs or other entities external to the node. FIG. 1 shows a single switch 24 in each hypervisor for the sake of clarity. Real-life implementation will often comprise multiple interconnected virtual switches and/or virtual bridges per hypervisor.

In some embodiments, system 20 comprises an authentication failure analysis unit 25, which detects hostile activity in network 20 by analyzing failed authentication attempts. The functionality of unit 25 is addressed in detail below. Unit 25 comprises an interface 27 for communicating over network 26, and a processor 28 that is configured to carry out the methods described herein. Unit 25 also comprises, or has access to, a database 32 for storing relevant information for analysis.

In some embodiments, at least some of the functionality of authentication failure analysis unit 25 is distributed among nodes 21. In these embodiments, each hypervisor runs a respective detection agent 29. In an example embodiment, each agent 29 is configured to identify traffic relating to authentication attempts, and to forward this traffic to processor 28 for logging and analysis. In some embodiments, agents 29 detect traffic relating to authentication attempts using VM memory introspection, i.e., by directly accessing the VM memory. Unit 25 and agents 29 are collectively regarded as a security system that carries out the disclosed techniques.

In some embodiments, unit 25 belongs (at least logically) to a different network, e.g., a separate Virtual Local Area Network (VLAN). This sort of separation improves the resilience of unit 25 to hostile penetration or manipulation.

Processor 28 of unit 25 may initiate any suitable action in response to detecting a suspected hostile activity. For example, processor 28 may issue a warning or alert to an administrator. Additionally or alternatively, processor 28 may redirect a suspected session to a honeypot 44 for subsequent analysis. In another embodiment, processor 28 may redirect subsequent traffic of the suspicious client to honeypot 44 (additionally or alternatively to redirecting the authentication session itself).

In some embodiments, processor 28 obtains additional information regarding failed authentication attempts from logs 40 kept by one or more authentication servers 36. The information obtained from authentication servers complements the information obtained from the traffic, and may help improve detection probability and reduce the probability of false detections. Processor 28 may communicate with any suitable type of authentication server 36, such as Server Message Block (SMB) server or Remote Authentication Dial-In User Service (RADIUS) server.

The configuration of system 20 shown in FIG. 1 is an example configuration that is depicted purely for the sake of conceptual clarity. In alternative embodiments, any other suitable system configuration can be used. Several alternative configurations are described further below.

The different system elements shown in FIG. 1 may be implemented using any suitable hardware, such as using one or more Application-Specific Integrated Circuit (ASICs) or Field-Programmable Gate Array (FPGAs). Alternatively, the various system elements can be implemented using software, or using a combination of hardware and software elements.

In some embodiments, unit 25 and/or agents 29 may be implemented using one or more processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Detection of Hostile Network Activity Based on Authentication Failure Analysis

Authentication transactions in system 20 are typically performed using one or more known authentication protocols, such as NT LAN Manager (NTLM), Remote Authentication Dial-In User Service (RADIUS), Kerberos, or any other suitable protocol. Some authentication protocols may be encapsulated in other network protocols, such as in the case of Server Message Block (SMB) that uses NTLM. Other protocols, such as RADIUS, are executed independently and produce a privileges token or ticket that can be used for accessing different resources.

In many cases, it is possible to inspect an authentication attempt by analyzing the packets exchanged in the process. Most protocols do not enable access to private information such as the provided credentials. Nevertheless, metadata relating to the authentication process can still be extracted from the packets that carry the authentication request and reply. In particular, the type of protocol and the authentication result (success or failure) can be extracted or deduced.

In some embodiments, each agent 29 monitors the packets that traverse its respective switch 24. When a given agent 29 identifies packets that carry an authentication attempt, the agent forwards these packets to unit 25. Processor 28 stores the packets in database 32, and subsequently analyzes them to determine whether the authentication attempt has succeeded or failed, and whether it is innocent or hostile.

In the example flow above, agents 29 identify and forward traffic relating to authentication attempts (both successful and failed), and processor 28 identifies which of the attempts have failed. This division of functions, however, is not mandatory. For example, in an alternative embodiment agent 29 may distinguish between failed and successful authentication attempts, and forward only the traffic relating to failed attempts to unit 25. The description that follows refers to the former division of functions, for the sake of clarity.

In various embodiments, and depending on the properties of the applicable authentication protocol, processor 28 may use various techniques for identifying whether a given authentication attempt has succeeded or failed. In some embodiments, the authentication result is indicated explicitly in the authentication reply, and can be extracted by processor 28. The authentication result may be reported, for example, in terms of success or failure, or in terms of granting or denial of access. In other embodiments, processor 28 may deduce the success or failure implicitly from a characteristic of the packets, e.g., from the number of packets exchanged in the transaction.

Consider, for example, the authentication process of the NTLMSSP protocol (used by CIFS, IIS HTTP, MSRPC and other protocols) over SMB2. Agent 29 may identify an NTLMSSP authentication attempt (request) by identifying that (i) SMB header command="Session Setup Request", and (ii) NTLMSSP message type="NTLMSSP_RUTH". From this packet, agent 29 can also extract information such as the source IP address, destination IP address, user name and host name.

Processor 28 may identify a successful NTLMSSP authentication reply by identifying that (i) SMB header command="Session Setup Response", (ii) SMB header NT status="STATUS_SUCCESS" and (iii) negResult field="accept-completed". Processor 28 may identify a failed NTLMSSP authentication reply by identifying that (i) SMB header command="Session Setup Response", and (ii) SMB header NT status="STATUS_LOGON_FAILURE" or "STATUS_ACCESS_DENIED". In some embodiments, processor 28 may associate NTLMSSP authentication requests with their respective authentication replies using the "Session Id" field in the SMB header.

As another example, consider the authentication process of the RADIUS protocol (using UDP port 1812). In this protocol, processor 28 may identify an authentication attempt (request) by identifying that Code="Access-Request (1)". From this packet, agent 29 can also extract information such as the source IP address, destination IP address and user name. Processor 28 may identify a successful RADIUS authentication reply by identifying that Code="Access-Accept(2)". Processor 28 may identify a failed RADIUS authentication reply by identifying that Code="Access-Reject(3)". In some embodiments, processor 28 may associate RADIUS authentication requests with their respective authentication replies using the Packet identifier field.

Further alternatively, processor 28 and/or agents 29 may use any other suitable technique for identifying authentication attempts and replies, and for identifying whether a given authentication attempt has succeeded or failed.

In various embodiments, processor 28 of unit 25 may use various detection criteria for deciding whether the identified authentication failures are likely to be caused by hostile activity. Hostile activity may comprise, for example, an unauthorized attempt to gain access to some resource. An innocent authentication failure may be caused, for example, by a legitimate user mistyping his username or password. Typically, processor 28 evaluates a detection criterion over multiple (failed and/or successful) authentication transactions that are logged in database 32.

For example, a detection criterion may declare hostile activity if finding that a certain node 21 makes more than a predefined number of consecutive unsuccessful authentication attempts with a given service on a given server. Another detection criterion may declare hostile activity if a certain node 21 makes more than a predefined number of unsuccessful authentication attempts with more than a predefined number of servers during some predefined time frame. Yet another detection criterion may declare hostile activity if a more than a predefined number of consecutive unsuccessful authentication attempts are made by a given user.

Additionally or alternatively, processor 28 may use any other suitable type of detection criterion. Some detection criteria may take into account both failed and successful authentication attempts.

Figure 2:
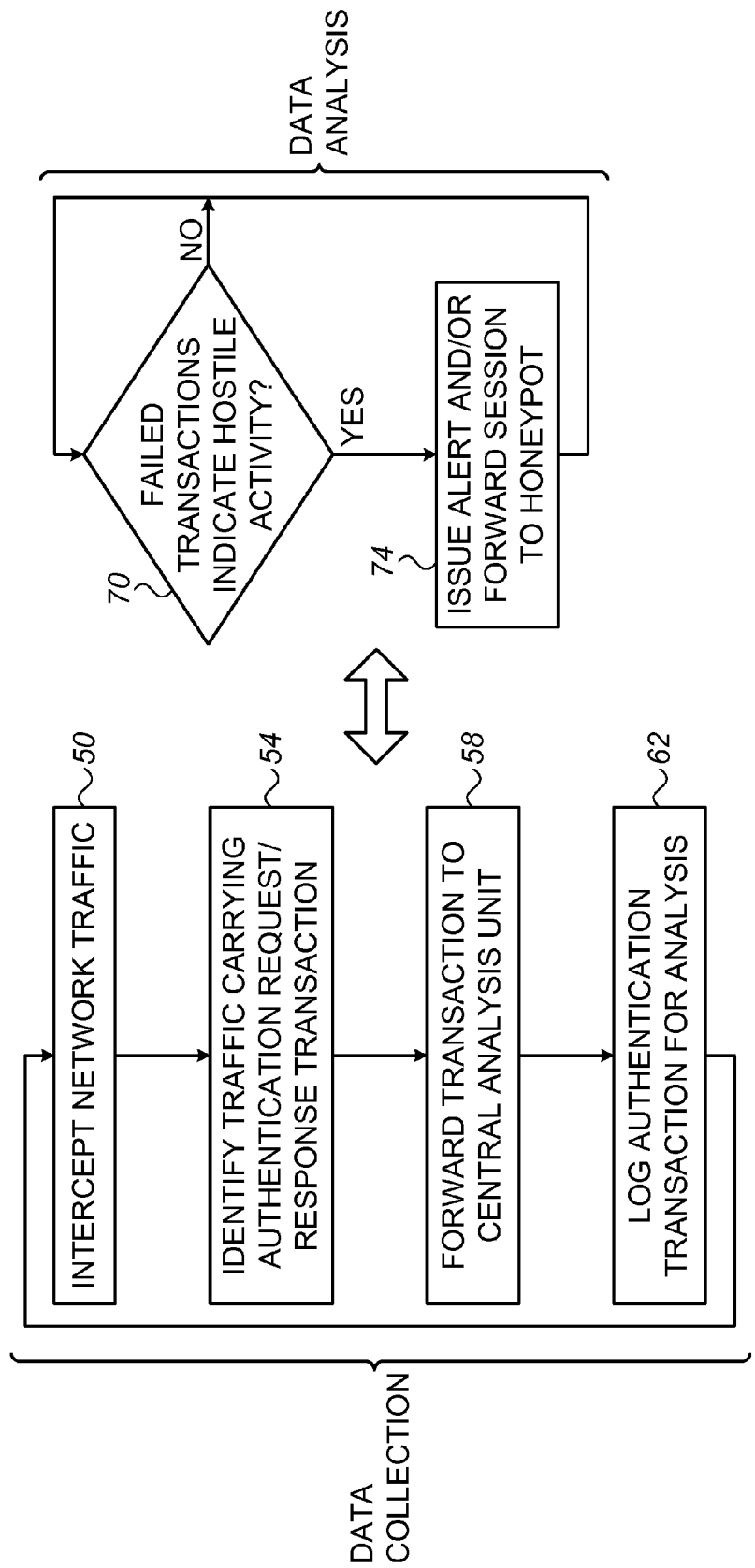
FIG. 2 is a flow chart that schematically illustrates a method for network security based on detection of authentication failures, in accordance with an embodiment of the present invention.

FIG. 2 is a flow chart that schematically illustrates a method for network security based on detection of authentication failures, in accordance with an example embodiment of the present invention. The left-hand-side of the figure illustrates the data collection process performed mainly by agents 29. The right-hand-side of the figure illustrates the analysis process performed mainly by unit 25. The two processes are typically carried out in parallel.

The data collection process (left-hand-side of FIG. 2) begins with agents 29 intercepting network traffic, e.g., packets, at a monitoring step 50. At an authentication identification step 54, agents 29 identify which of the monitored traffic relates to authentication transactions. Agents 29 forward the identified transactions to unit 25, at a forwarding step 58. Processor 28 of unit 25 logs the forwarded transactions in database 32, at a logging step 62. The logged transactions are used in the analysis process described below.

The analysis process (right-hand-side of FIG. 2) begins with processor 28 checking whether any of the failed authentication transactions logged in database 32 are likely to be indicative of hostile activity, at a checking step 70. Any of the detection criteria described above, or any other suitable criterion, can be used for this purpose. Upon detecting a suspected hostile activity, processor 28 initiates responsive action, at a reaction step 74. Processor 28 may, for example, issue an alert and/or redirect the session in question to honeypot 44.

The processes shown in FIG. 2 are depicted purely by way of example. In alternative embodiments, any other suitable processes can be used.

In various embodiments, elements of the security system (e.g., agents 29) may use various techniques for monitoring or intercepting network traffic. In one embodiment, software agents 29 in hypervisors 23 access the traffic flowing through the virtual switch fabrics 24 of their respective nodes 21. In another embodiment, suitable software agents may be installed in physical network elements (e.g., physical switches or routers) of the network. Such agents may access the traffic flowing through the physical network elements.

In yet another embodiment, the security system may comprise an in-line monitoring unit that is located in the traffic path. In other words, some or all of the network traffic passes in-line through the monitoring unit, thus providing the system access to the traffic. Such a monitoring unit may be integrated with, or separate from, analysis unit 25. In still another embodiment, the network in question may comprise a Software-Defined Network (SDN), in which the network switches may be configured to mirror selected traffic to unit 25. An example SDN implementation is described below.

In yet other embodiments, the disclosed techniques can be carried out using a software agent that runs in one of the endpoints of the authentication session and is configured to detect and report authentication failures to unit 25. Such an agent may run in the source client (the computer that requests authentication) or in the target server (the computer with which the source node requests to authenticate). One example use-case for such a solution is Linux-based data centers, in which Secure Shell (SSH) is authenticated locally on each server.

In some embodiments, one of the processors in system 20 assesses whether a failed authentication attempt is hostile or innocent, by accessing and examining software running on the client computer that initiated the authentication attempt. In an example embodiment, when the authentication request was sent by a certain VM, the hypervisor that hosts the VM may access the VM memory directly, e.g., using memory introspection, and investigate the process that initiated the authentication request. In an alternative embodiment, a software agent may run on the client computer, and may access and investigate the software or process that initiated the authentication request. For example, an abnormal process attempting to authenticate may be indicative of malware that uses stolen credentials.

Alternative Implementation Using SDN

In a typical SDN architecture, the network switches are configured and controlled by an SDN controller. In particular, the SDN controller may configure the switches to mirror selected packets to a specified destination. Using this capability, an SDN switch may be configured by the controller to select certain packets that traverse the switch and possibly relate to authentication transactions, and to mirror these packets to analysis unit 25.

In some embodiments, the SDN controller configures the switches remotely by installing suitable forwarding rules on the switches, or locally using suitable plug-ins or extensions. Various SDN protocols can be used for configuring the switches and for mirroring authentication-related traffic. The description that follows refers mainly to the Openflow protocol, by way of example.

In an example SDN workflow, the switches mirror packets of a given session to unit 25, and unit 25 extracts packets relating to authentication attempts, e.g., authentication requests and responses. Once the authentication-related packets have been extracted, the remainder of the session is offloaded, i.e., mirroring of packets of that session is stopped.

The above workflow may be implemented, for example, using an extension or plug-in of the SDN controller, or using a separate application that connects to the SDN controller via a suitable Application Programming Interface (API). As another example, the SDN switches may be configured directly, e.g., using Openflow, irrespective of any SDN controller that may be present or absent.

In some embodiments, in order to avoid duplicate mirroring of packets, mirroring is performed only on switch ports that are not connected to other SDN switches. For example, mirroring may be performed on switch ports connected to endpoints, and not on switch ports connected to other switches.

Different types of SDN switches may be capable of selecting and mirroring packets with different granularities. For example, when an SDN switch has fine packet matching capability, the switch may be able to identify and mirror only authentication-related packets to unit 25. When an SDN switch has only coarse packet matching granularity, the switch may mirror a larger number of packets, only some of which are actually related to authentication. For example, the switch may be configured to mirror all the packets that use the port known to be used for authentication. In the latter embodiment, unit 25 has the additional task of filtering the packets and retaining only the packets of interest.

Consider, for example, a network based on Open vSwitch switches (version 2.1.2). In these switches, the best pattern matching granularity that can be used for mirroring is layer-4 port values. Therefore, in order to mirror SMB2 NTLMSSP authentication packets, the switches are configured to mirror tcp.port==445. In order to mirror RADIUS authentication packets the switches are configured to mirror udp.port==1812.

In this example, unit 25 inspects each session (corresponding to 5-tuple) mirrored thereto, and extracts authentication request and response packets. Unit 25 may perform this task in various ways.

In one example implementation, each session is passed through the following state machine:
  a. Identify the Authentication Protocol.
  b. If the protocol is not supported, offload the session.
  c. Otherwise, wait for an authentication request and response and save them (this stage is typically different between protocols).
  d. If the authentication attempt failed and more than one authentication attempt in a single session is supported, Goto c.
  e. Otherwise, offload the session.

In another example implementation, unit 25 reads a constant number of packets or bytes from the mirrored session:
  a. Read the first X packets or bytes of each session mirrored to unit 25.

b. Extract authentication requests and responses, if found.
c. offload the session.

Offloading a session from unit 25 may be performed, for example, by installing on the SDN switches new flows that override the mirroring operation for a specific session. This mechanism typically prevents most of the session data from reaching unit 25. As a result, unit 25 may operate in a high-volume-traffic environment while consuming minimal system resources. For example, in a network with Open vSwitch switches (version 2.1.2), the override mechanism may be carried out by installing a new flow, which has a priority higher than the mirroring flows and instructs the switch to skip the mirror rule for a specific 5-tuple (associated with the session to be offloaded).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
monitoring both (i) communication traffic that is exchanged with a client over a computer network, and (ii) software processes running in a memory of the client;
identifying in at least part of the monitored communication traffic one or more authentication attempts that were initiated by the client and have failed; and
distinguishing whether the failed authentication attempts are innocent or caused by a hostile activity in the computer network, by investigating, using memory introspection in the memory of the client, a software process that initiated the failed authentication attempts.

2. The method according to claim 1, wherein at least part of the communication traffic traverses a virtual switching fabric in a hypervisor of a node of the computer network, and wherein monitoring the communication traffic comprises running in the hypervisor a software agent that monitors the at least part of the communication traffic.

3. The method according to claim 1, wherein monitoring the communication traffic comprises passing at least part of the communication traffic in-line through an analysis unit.

4. The method according to claim 1, wherein monitoring the communication traffic comprises instructing a virtual or physical network element in the computer network to mirror at least part of the communication traffic for monitoring.

5. The method according to claim 4, wherein the computer network comprises a Software-Defined Network (SDN), and wherein instructing the virtual or physical network element is performed using an SDN protocol.

6. The method according to claim 1, wherein monitoring the communication traffic comprises running in the client a software agent that monitors the at least part of the communication traffic.

7. The method according to claim 1, wherein identifying the authentication attempts that have failed comprises identifying in the communication traffic an authentication response message, extracting a field value from the authentication response message, and detecting a failed authentication attempt based on the extracted field value.

8. The method according to claim 7, wherein extracting the field value comprises extracting an authentication result reported in the authentication response message.

9. The method according to claim 1, wherein identifying the authentication attempts that have failed comprises deducing a failure of an authentication attempt from a count of packets exchanged during the authentication attempt.

10. The method according to claim 1, wherein detecting the hostile activity comprises accumulating multiple failed authentication attempts, and evaluating a detection criterion over the multiple failed authentication attempts.

11. The method according to claim 1, and comprising obtaining additional information relating to failed authentication attempts from an authentication server, wherein detecting the hostile activity comprises identifying the hostile activity based on both the failed authentication attempts identified in the communication traffic, and the additional information.

12. A system, comprising:
at least one interface for connecting to a computer network; and
one or more processors, which are configured to monitor both (i) communication traffic that is exchanged with a client over the computer network and (ii) software processes running in a memory of the client, to identify in at least part of the monitored communication traffic one or more authentication attempts that were initiated by the client and have failed, and to distinguish whether the failed authentication attempts are innocent or caused by a hostile activity in the computer network, by investigating, using memory introspection in the memory of the client, a software process that initiated the failed authentication attempts.

13. The system according to claim 12, wherein at least part of the communication traffic traverses a virtual switching fabric in a hypervisor of one of the processors, and wherein the one of the processors is configured to run in the hypervisor a software agent that monitors the at least part of the communication traffic.

14. The system according to claim 12, wherein at least one of the processors is configured to monitor at least part of the communication traffic passing in-line through an analysis unit.

15. The system according to claim 12, wherein at least one of the processors is configured to instruct a virtual or physical network element in the computer network to mirror at least part of the communication traffic for monitoring.

16. The system according to claim 15, wherein the computer network comprises a Software-Defined Network (SDN), and wherein at least one of the processors is configured to instruct the virtual or physical network element using an SDN protocol.

17. The system according to claim 12, wherein at least one of the processors is comprised in the client, and is configured to run a software agent that monitors the at least part of the communication traffic.

18. The system according to claim 12, wherein at least one of the processors is configured to identify the authentication attempts that have failed by identifying in the communication traffic an authentication response message, extracting a field value from the authentication response message, and detecting a failed authentication attempt based on the extracted field value.

19. The system according to claim 18, wherein the field value comprises an authentication result reported in the authentication response message.

20. The system according to claim 12, wherein at least one of the processors is configured to identify the authentication attempts that have failed by deducing a failure of an authentication attempt from a count of packets exchanged during the authentication attempt.

21. The system according to claim 12, wherein at least one of the processors is configured to accumulate multiple failed authentication attempts, and to evaluate a detection criterion over the multiple failed authentication attempts.

22. The system according to claim 12, wherein at least one of the processors is configured to obtain additional information relating to failed authentication attempts from an authentication server, and to identify the hostile activity based on both the failed authentication attempts identified in the communication traffic, and the additional information.

23. A computer software product, the product comprising a tangible non-transitory computer-readable medium in which program instructions are stored, which instructions, when read by one or more processors, cause the processors to monitor both (i) communication traffic that is exchanged with a client over the computer network and (ii) software processes running in a memory of the client, to identify in at least part of the monitored communication traffic one or more authentication attempts that were initiated by the client and have failed, and to distinguish whether the failed authentication attempts are innocent or caused by a hostile activity in the computer network, by investigating, using memory introspection in the memory of the client, a software process that initiated the failed authentication attempts.

* * * * *